Jan. 14, 1964  E. P. G. WRIGHT  3,118,131
DATA PROCESSING EQUIPMENT
Filed Aug. 26, 1957  3 Sheets-Sheet 1
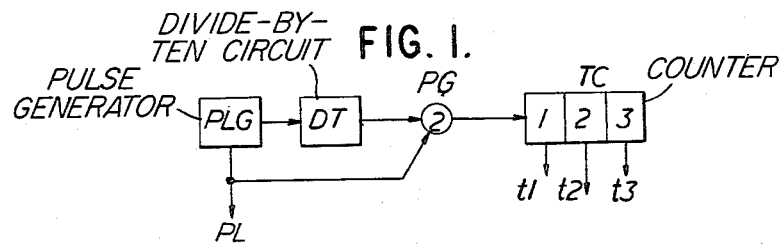
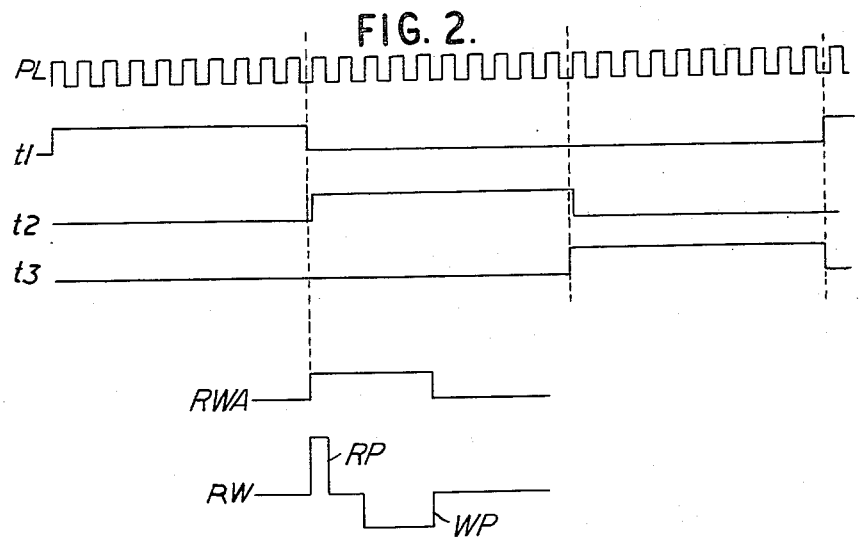
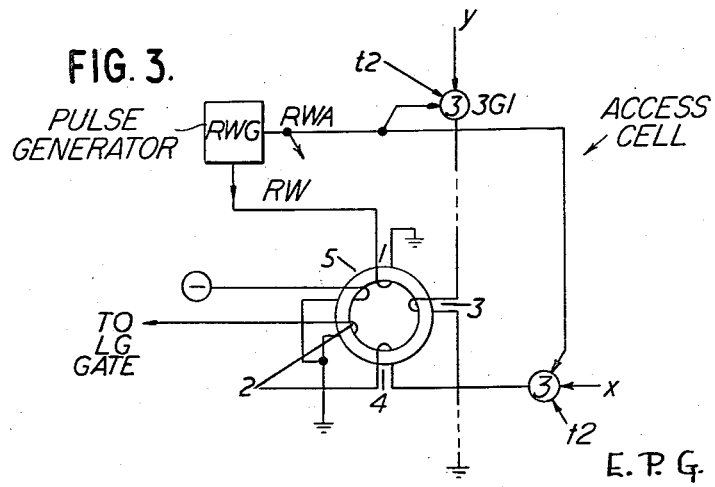
Inventor
E. P. G. Wright
By Robert Harding Jr.
Attorney Jan. 14, 1964  E. P. G. WRIGHT  3,118,131
DATA PROCESSING EQUIPMENT
Filed Aug. 26, 1957  3 Sheets-Sheet 2

Inventor
E. P. G. Wright
By Robert Harding Jr.
Attorney

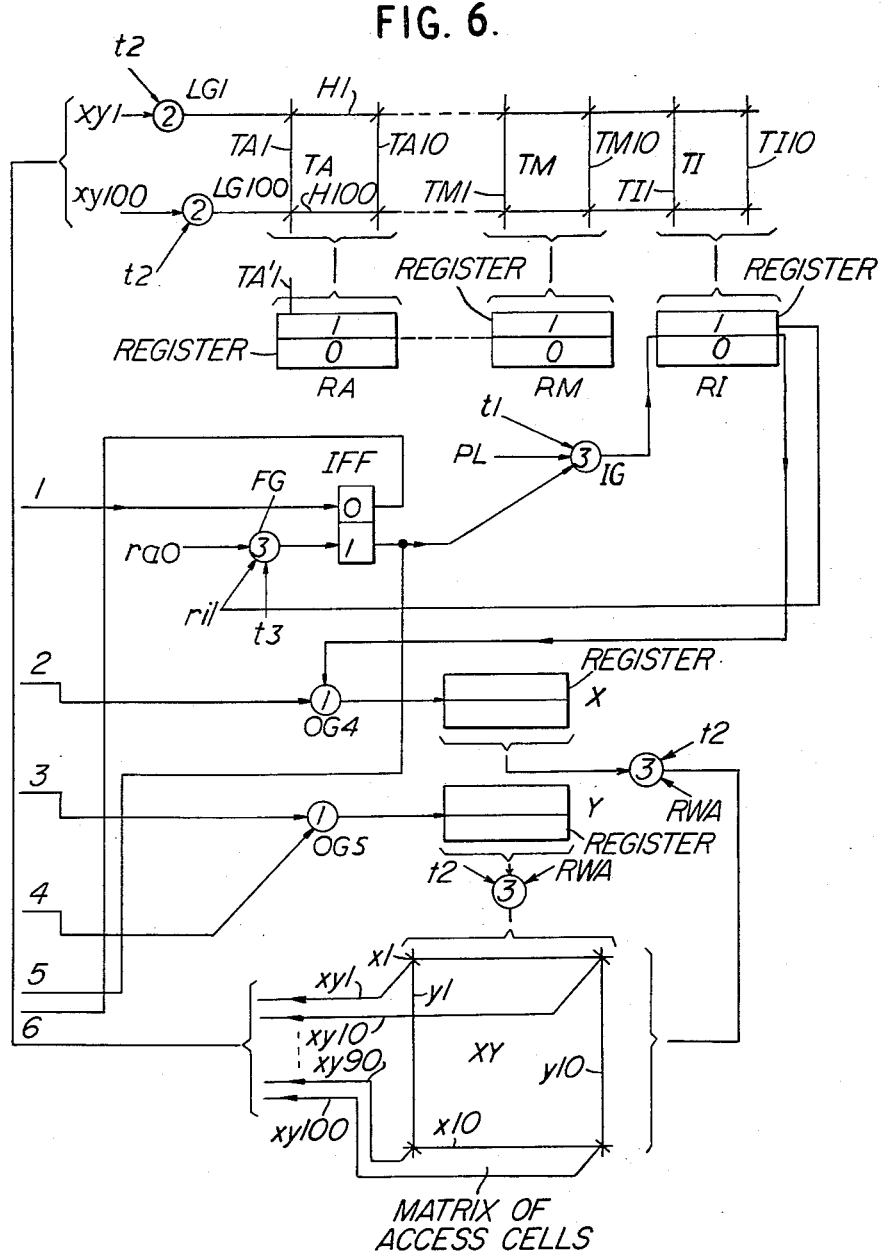

United States Patent Office 3,118,131
Patented Jan. 14, 1964

3,118,131
DATA PROCESSING EQUIPMENT
Esmond Philip Goodwin Wright, London, England, assignor to International Standard Electric Corporation, New York, N.Y., a corporation of Delaware
Filed Aug. 26, 1957, Ser. No. 680,231
Claims priority, application Great Britain Aug. 28, 1956
5 Claims. (Cl. 340—167)

The present invention relates to data processing equipment, and has for its object the transmission of orders comprising varying members of instruction items.

An example of such a requirement occurs in automatic telephone exchange systems when subscriber dialling over large areas, for instance on a national or international, basis, is considered. In such circumstances, dependent on whether short distance, or long distance, connections are required, the number of digits in a wanted subscriber's directory number which determine the routing of a connection to a wanted subscriber may vary within substantial limits. For instance, for international calls the first digit dialled may determine the country of destination, and this digit alone may determine the routing from the originating exchange in one country through a first international exchange in that country to a second international exchange in the country of destination, after which the whole wanted subscriber's number may be transferred to the second international exchange for use in further setting up of the connection. In other calls, for instance, the first three digits may need examination as a group to determine the routing to the wanted exchange, or the first two digits may contain sufficient information to determine the routing, and so on.

Such requirements call for examination of the digits of a wanted subscriber's number in different combinations determined by the results of successive examinations of, for instance, the first digit, the first pair of digits, and so on.

Generalising, the routing digits of a telephone subscriber's number can be considered as instruction items to a register, which can be regarded as a data-processing equipment.

It is therefore an object of the present invention to provide data processing equipment capable of dealing with orders having different numbers of instruction items.

According to the present invention there is provided means for determining how many of a succession of instruction items is required for a particular purpose comprising means for examining a first instruction item or plurality of primary instruction items, means for making available an interim instruction item if said first item or plurality of items is insufficient, and means for combining said interim instruction item with a further primary instruction item; for further examination.

It will be clearly understood that this invention is not limited in its applications to telephone exchange systems.

The invention will now be described with reference to the accompanying drawings, in which:

FIG. 1 shows a circuit for generating certain pulse trains used in the arrangement described herein, FIG. 2 shows pulse waveforms including those obtained from the circuit of FIG. 1, FIG. 3 shows how a single cell of an access switch operates, FIG. 4 shows a single column read/write circuit used in the arrangement of FIG. 6, FIGS. 5 and 6, of which FIG. 6 should be placed to the right of FIG. 5, show schematically an embodiment of the present invention.

*General Description*

Before commencing the description of the drawings, the arrangement will first be described briefly.

A wanted subscriber's number is assumed to include either two digit or three digit routing combinations, i.e. each instruction can have two or three items. When a call is initiated, the caller's line is extended in known manner to a register which has access to a translator.

The major portion of the translator consists of a ferromagnetic co-ordinate store, consisting of ferromagnetic cells threaded with wires. The individual cells are arranged in a stack of horizontal rows so that corresponding cells in each row, e.g. all first cells, form a column. Thus we have a co-ordinate array of $m$ rows and $n$ columns. Each cell can be an individual toroid, or a row of cells can be constituted by a row of holes in a block of ferrite material, the material surrounding each hole acting as a toroid. Row and column wires are threaded respectively through all the cells in a row or column, each wire passing through a cell forming a winding therefor. There are $m$ row wires and $n$ column wires for an array with $m$ rows and $n$ columns. By applying suitable electrical currents to a row and/or a column wire, a row of cells, or a single cell, or a column of cells can be selected.

The conventional method of selecting a cell is to energize the row wire which passes through the cell and the column wire which passes through the same cell each with a current of half the magnitude necessary to change the state of the cell, the energisations both being in the direction appropriate to set a cell to its 0 state. The result of this is that if the cell threaded by both of the energised wires was in its 1 state, it is driven from that state to its 0 state, and this change-over of the cell causes a pulse to occur on a reading winding which threads that cell. If, however, the cell was in its 0 state, then there is little or no output on the reading winding as a result of the simultaneous energisation of both wires which thread the cell. Hence the state in which the cell is when reading occurs, determines the nature of the output. To write into a cell, that cell is selected and driven to 0 or 1, as required, by applying half the necessary conditions to the row wire and half to the column wire. In a typical, well-known arrangement, the sequence is (a) Select a cell by energising its row wire and its column wire with half-pulses for setting it to 0.
(b) Note output pulse if the cell was at 1, little or no pulse if at 0.
(c) Record in the cell either by applying half pulses for setting to 1, if the cell is to be left at 1, or by applying no further pulses if the cell is to be left at 0.

In the arrangement described herein, the selection involves selecting a whole row of the array, by applying a full read pulse, which can drive the cells from "1" saturation to "0" saturation, to all cells of the row. In this case the column wires are used as output wires, so that the application of a read pulse to the wanted row of cells causes pulses to appear on the column wires passing through cells which were at 1 when read. Each column wire is connected to an amplifier and pulse-shaper which provides its output. In the present system, the read out, since it sets all cells read to 0, destroys the stored information; therefore what is read out must be re-recorded. To do this, the read pulse on the row wire is followed, after a brief pause, by half of a "write-1" pulse. Such a pulse will hereinafter be called a half-write pulse. At the same time, the output from the pulse shapers mentioned above causes half-write pulses to be applied to all column wires from which a pulse was read out. Therefore the selection of a row for reading involves applying thereto a read pulse, followed by a half-write pulse. The read pulse reads all information out of the row, and when the half-write pulse occurs, the information is re-recorded in the row.

To write an item of information into a row, the row wire is energised with a half write pulse and half-write pulses are applied to the column wires for cells which are to be set at 1, regarding the information as a combinations of 1's and 0's. With the arrangement described herein, it will normally be necessary to write new information in once only: all operations involve read out and re-recording of already-stored information.

Such co-ordinate arrays or stores are, of course well-known, and can be bought over the counter. In most cases, as in the present, ferro-magnetic storage cells are used, but a possible alternative is to use a co-ordinate array of ferro-electric cells.

Examples of co-ordinate ferro-magnetic stores into which data is recorded a row at a time and from which data is read a row at a time will be found in British patent specification Nos. 749,796 and 750,636, and in Australian patent specification No. 115,590 of 1955 (published in March 1956), while British patent specification No. 719,288 (Western Electric Co.) shows a similar store using ferro-electric storage cells.

The operation of the system will now be briefly described.

When a subscriber initiates a call, the calling line is extended via a line finder to a speech channel, and a register is seized and connected thereto. The subscriber now dials the wanted number, and the routing digits which he dials are stored respectively in three electronic storage circuits of well known type, such as that disclosed in U.S. Patent No. 2,649,502. It will be remembered that the routing digit combination is assumed to consist of 2 or 3 digits. Hence as soon as two digits have been received, those two digits together control the selection of a row of the co-ordinate store. Each row of this store has pre-recorded in it either a multi-digit translation or a single digit interim instruction. If the wanted number's routing digit combination included only 2 digits, then the row of the array identified thereby contains the wanted translation. This translation is therefore read-out into a special set of electronic stores reserved for that purpose. The translation is also, of course re-recorded in the row from which it was read.

If the wanted number's routing digit combination consists of 3 digits, then the selection of a row of the array in response to the reception of the first two digits causes an interim instruction to be read out. This is a single code digit, which is placed in a further electronic store. The digits of a multi-digit translation are recorded in cells threaded by one set of column wires while an interim instruction digit is recorded in cells threaded via a further set of column wires. Hence the read out of information on the further set of column wires indicates that it is necessary to await the reception of a third digit before the wanted translation can be obtained.

The above operations, i.e. the row selection and the read out of an interim instruction, or of a final translation), all occur within an inter-digital pause since they occur at "electronic" speeds, which are very great compared with the rate at which dialled digits are received.

When the third dialled routing digit is received, it enters one of the first named electronic stores. This digit and the interim instruction digit (which was obtained in response to the first two dialled digits) now co-operate to select a row of the array. This selection causes the wanted translation to be read from the cells of the selected row which are threaded by column wires of the second set. Thus in the case of a three digit combination there are two row selections, one to obtain an interim instruction digit and one to obtain the final routing digits.

It will be readily apparent that a selection as mentioned above can be performed after a first, second, third, . . . and so on digit, or instruction item, to use the more generalised terminology, each such selection giving rise to an interim instruction item, which is used in cooperation with one or more subsequently received items.

Detailed Description

Figure 4:
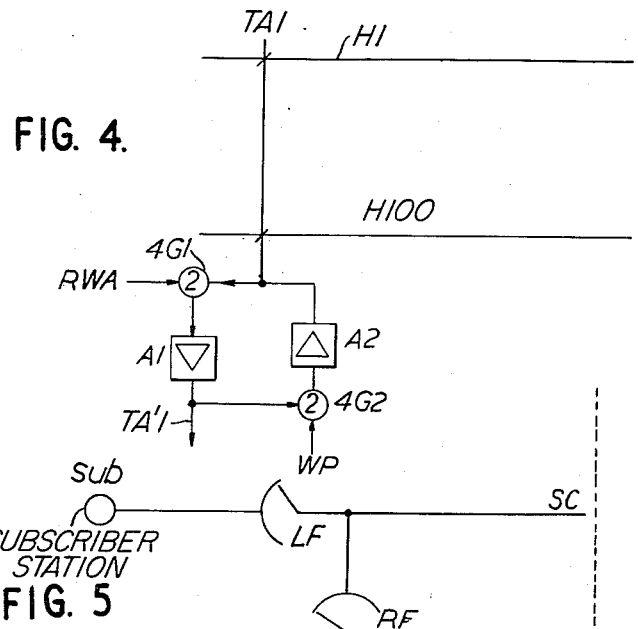

The operation of the circuit is controlled by two groups of electrical pulse time cycles, the first group, a continuous succession of pulses PL, from the pulse generator PLG (FIG. 1), consisting of relatively short pulses (used, see below, in batches of 10), and the other group consisting of three separate staggered pulse trains t1, t2, t3, each of which (as shown in FIG. 2) lasts for a time equal to 10 PL pulses. The successive PL pulses are delivered to a divide-by-ten circuit DT which may be a ring counter having 10 stepping positions, the last one of which produces an output. The counter steps from one position to the next in response to the receipt of a PL pulse and on the 10th pulse it will have reached the last position, whereupon an output pulse is produced, and the next PL pulse will return the counter to its first position. Thus, every 10 PL pulses received by the circuit DT will produce an output pulse.

This output pulse is delivered to one input of a gate PG which has another input on which the successive pulses PL from the pulse generator PLG are applied. The figure 2 inside of the circle representing the gate PG indicates that two inputs must be applied before the gate is opened. A 3 within the circle would indicate that three inputs would be required. When the output pulse from the divide-by-ten circuit DT coincides with one of the PL pulses, the gate PG will open and deliver an output pulse to a counter TC. This counter is a ring counter and has three stages. Each stage will remain energised until another input pulse is received from the gate PG. Thus, each stage will remain energized for a period of time equal to ten of the PL pulses. The three pulse trains of 10 PL pulses are derived from the stages of the counter TC. Each occurs on a different output from TC, which output can include an amplifier (not shown), if required.

It is now desirable to consider the access selector, that is, the co-ordinate matrix of ferromagnetic cells (FIG. 6) which is used to select wanted rows. This consists of a number of cells at least equal to the number of rows of the main co-ordinate array in which translations or interim instructions are stored, each such cell being individual to one row of the main co-ordinate array TA–TM and TI. The operation of this access selector will be clear from a study of FIG. 3, which shows a single cell of the array XY forming the access selector. This cell has five windings, an input winding 1, an output winding 2, a column winding 3, a row winding 4, and a bias winding 5.

The input winding is fed a voltage wave-form RW, produced by a pulse generator RWG. This wave-form has two parts, as shown, one a positive pulse RP and the other, occurring at a later time, a negative pulse WP. The pulse RP is a read pulse and the pulse WP is a write pulse.

The current which normally flows, in the bias windings of all cells is such that, in the rest condition, all cells are heavily negatively saturated. An energisation of a row winding or a column winding is in such a direction as to oppose the bias, but neither can unsaturate the cell alone. However, if a cell has its row winding *and* its column winding simultaneously energised, it is unsaturated, since the sum of these two conditions overcomes the effects of the bias. Hence the selected cell is rendered effective as a transformer, and so the waveform RW (from the generator RWG) passes to the output winding 2. Thus the cell can be regarded as being analogous to a gate in that the coincidence of conditions on its row and column wires open it so that it passes a waveform RW to its output winding. When the coincidence just mentioned ends, the bias again assumes control so as to saturate the cell once again.

The duration of the select condition applied to XY is such that the cell only passes one read-half-write waveform RW. To ensure that this is so, the row and column windings are each fed via a gate, such as 3G1 in FIG. 3. This has one input which is energised when the appropriate output from store X is energised and another input which is energised by an output from RWG on which occurs a positive RWA (FIG. 2) pulse whose duration equals that of a read-half-write pulse. There is also a third input energised by the $t2$ pulse, whose purpose will become apparent in due course. Such a gate is provided for each X output and each Y output of FIG. 6. Immediately that an output has been obtained from one of the cells of XY, the two registers X and Y are zeroised by means not shown, but well-known in the art, e.g. the actual output from the winding 2 of the selected cell can be used as a reset condition for X and Y. This has been omitted from the drawings to avoid unnecessarily complicating the drawings.

In FIG. 6, the first and last row wires $x_1$ and $x_{10}$ and the first and last column wires $y_1$ and $y_{10}$ only are shown, the cells at the intersections thereof being shown schematically by short transverse lines.

FIG. 4 shows the circuitry associated with column TA1 of storage cells of the main array. All the other column wires of TA . . . TM and TI have similar circuits. This consists of an amplifier A1 fed by a gate 4G1 whose other input is a pulse RWA, from the pulse generator RWG and coincident with the pulse applied to gate 3G1 in FIG. 3. This, together with the amplifier, passes a reshaped output pulse when a 1 is read to the appropriate portion of the register RA . . . RM or RI (see below), in this case to input wire TA1 of RA. The output from A1 is also applied via a further gate 4G2, whose other input is supplied with a pulse WP which is the second portion of the read-half write wave form RW (FIG. 3), to amplifier A2. Hence if 1 is to be re-written, then 4G2 opens and A2 energises the associated column wire, in this case TA1. There will be no output from A1 if 0 is read because the input to A1 includes discriminating means (well-known) which ensures that A1 is unresponsive to the small pulse due to a 0.

Referring to FIG. 6, the main storage array includes two groups, of which the first consists of a number of sets TA . . . TM, one per digit, for the maximum number of digits in a translation, and having column wires TA1 . . . 10, . . . TM1 . . . 10, and a set TI having as many column wires TI1 . . . 10 as needed to register one digit. This can be regarded as a group of co-ordinate stores TA-TM and TI, all of which share the same row wires $H_1$ . . . $H_{100}$. Assuming that a translation includes up to 6 decimal digits, the first group of columns will include 6 sets each of 10 columns, and the second group will be a set of 10 columns. Each column has an associated circuit as shown in FIG. 4, and for each set of columns there is a register, RA, RM, RI being shown.

In each row of the array there is stored either a multi digit translation in the sections TA–TM, or a single digit interim instruction in section TI. Each digit is recorded by one of its unit cells being set to the 1 state and the other 9 being at 0. Other codes (e.g. binary coded decimal or 2-out-of-5 code) are usable, but by recording in the form of 1 out of 10, a considerable simplification of the associated circuitry is achieved.

In FIG. 6 only the first and last row wires $H_1$ and $H_{100}$ of the array, and the first and last column wires TA1 and TA10, TM1 and TM10, and TI and TI10 of the sets TA, TM, TI are shown. Each row of each set, as already mentioned can accommodate one decimal digit. The cells are represented schematically as short transverse lines. The column circuits (not shown in FIG. 6) are each as shown in FIG. 4.

Each of the stores RA, RM, RI can be a pattern movement register (also known as shifting registers of well-known type), e.g. as described in U.S. Patent No. 2,649,502 (A. D. Odell), into which data can be inserted in parallel fashion and from which the data can be extracted serially.

The reception and translation of a two-digit routing prefix and of a three-digit routing prefix will now be described.

Figure 5:
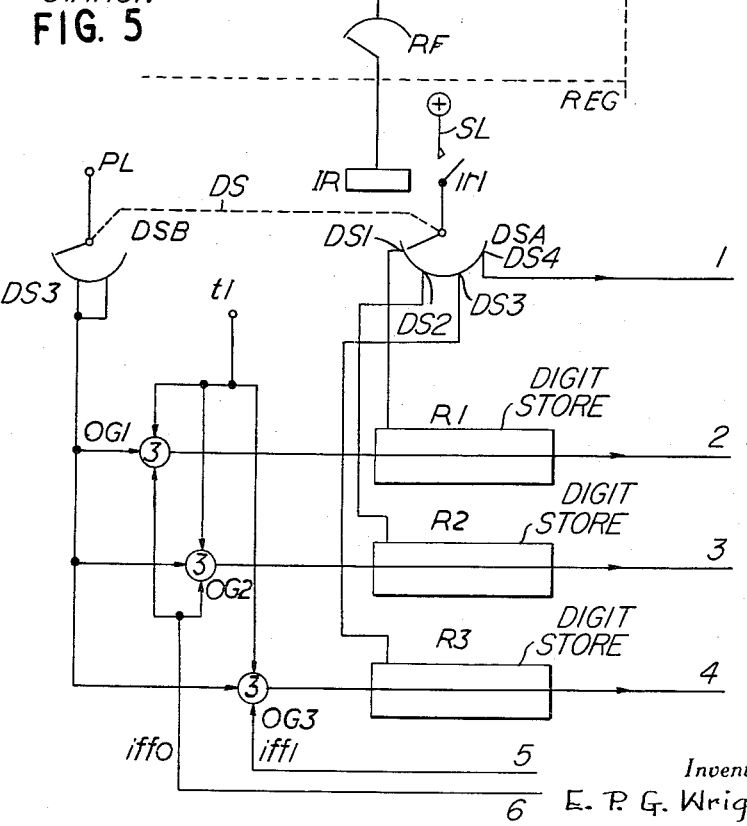

When a subscriber station, shown diagrammatically at SUB, FIG. 5, initiates a call, the calling line is automatically connected, in well-known manner, via a line-finder LF to a speech channel SC. At the same time a further switch RF automatically connects the channel SC to a register REG (FIGS. 5 and 6), and in particular to an impulse-responsive relay IR in that register. This, of course, follows the long-established principles of the automatic telephone switching art, and it is felt that no further description of this operation is necessary.

After the register has been seized, dial tone is sent to the subscriber in well known manner, and the subscriber dials the wanted number. When the first digit is dialled, the impulses thereof are repeated by relay IR via its contacts $ir1$, and signal impulses are sent from the lead SL via $ir1$ and bank DSA of a distributor switch DS in its first position (DS1) to a first digit store R1 in well-known manner. Hence the store R1 is set to a position characteristic of the first routing digit dialled by the caller.

At the end of the first digit, DS is stepped to its second position (DS2) in a manner well-known in the automatic telephone exchange art, and the second dialled digit is therefore repeated to a second store R2 via DSA. In like manner, DS is now stepped to its third position (DS3), wherein it causes the next dialled digit (if there is one) to be repeated to R3. After this, DS steps to DS4, for a purpose which will be referred to later.

The digit stores R1, R2 and R3 mentioned above are of the well-known pattern-movement register type, which record a digit in a chain of ten binary register devices by operating the register devices one by one in turn so that the reception of the digit 7, for instance, leaves the seventh out of the ten devices operated and the others non-operated. As already indicated, registers X and Y are similar to registers R1, R2 and R3.

To return to the description of the operation, after the second digit has been received into R2, DS is stepped to DS3, whereupon pulses PL are applied via contact DS3 of bank DSB of switch DS to the gates OG1, OG2, OG3, associated with stores R1, R2, R3 respectively. When the next $t1$ pulse occurs, gates OG1 and OG2 both open because bistable trigger device IFF is in its rest or "0" condition wherein its output $iff0$ is energised. As a result of this, 10 pulses PL are applied to R1, and these pulses transfer the digit in R1 over lead 2 to pattern movement register X via the gate OG4 (see FIG. 6). At the same time, OG2 passes 10 pulses PL to the store R2, and hence the digit therein is inserted over lead 3 and via gate OG5 into the pattern movement register Y. Both gates OG4 and OG5 require only one input, as indicated. Since the gates (3G1) controlling XY from X and Y are controlled by $t2$ (see FIG. 3), the insertion of the digits in X and Y is unable to affect the access cells XY.

As soon as X and Y are both set, the cell of the array XY which is identified by the digits in X and Y is operated at time $t2$ to the condition in which it passes a read/half-write waveform, as described above with reference to FIG. 3. It will be remembered that all cells of XY have individual outputs ($xy_1 \ldots xy_{1000}$), as shown schematically by the arrows in association with the cells indicated at the bottom of FIG. 6. Each cell's individual output is connected over its corresponding lead $xy_1 \ldots xy_{100}$ to a different one of the rows $H_1 \ldots H_{100}$ of the array TA . . . TM, TI via gates LG1 . . . LG10. Hence when the transformer formed by the cell of XY identified by the setting of X and Y "opens," one input to one of the "row" gates LG1–LG100 is energised. Since $t2$ is also energised (XY can only be operated in the period $t2$ following a setting of X and Y), the appropriate one of the gates LG1 to LG100 is opened and hence that row is selected.

It is assumed that we are dealing with a two digit order, and therefore the item of intelligence required is completely determined at this stage and is in fact recorded in the selected row of the storage array TA to TM. In consequence the read pulse on the corresponding level will, in well-known manner, cause the item of intelligence, in the present case a set of routing digits, to be transferred into the registers RA to RM associated therewith. Non destructive read out can be used. The routing digits recorded in RA to RM can now be used for any desired purpose, in the present example for controlling the establishment of a telephonic connection.

In time position $t3$ a check is made by gate FG to determine whether intelligence has been transferred from the arrays TA to TM or from array TI. If RA has all stages in the "1" condition and therefore is off-normal and RI has all stages in the "0" condition and therefore is in normal position, indicating that intelligence has been read from TA . . . TM, but not from TI, there will be no potentials on inputs $ra0$ and $ri1$ of gate FG and gate FG will not be opened, and that of course is the condition now existing, so that flip-flop IFF will not be operated and no further action will take place.

If the order was a three digit order, then an interim digit is required from the store TI when the first two digits select a row of the main storage array. This row will have a digit stored therein, but no routing digits will be stored in stores TA—TM of the main array. The operation takes place as before up to the opening of an LG gate corresponding to the setting of the co-ordinate array XY for the first two dialed digits. In this instance however the level selected contains intelligence only in TI and not in TA to TM. In consequence intelligence is transferred to RI and not to RA—RM. In position $t3$ therefore gate FG is opened since RA is wholly in position 0 and RI is off-normal and potentials appear to $ra0$ and $ri1$. Trigger flip-flop IFF is therefore operated to position 1, so that in the next succession of $t_1$, $t_2$, $t_3$, in time position $t1$, gates IG and OG3 are opened instead of OG1 and OG2, and pulses from the PL leads will transfer the contents of RI and R3 to X and Y respectively. That is, the interim instruction digit previously inserted in RI is transferred therefrom via gate OG4 to the pattern movement register X, while the third digit inserted in R3 is transferred via OG5 to the register Y.

Co-ordinate array XY now receives a new setting from X and Y, and at the next pulse $t2$, the appropriate one of the LG gates is opened to cause the routing digits corresponding to the three digit order to be transferred from TA—TM to the registers RA—RM for use.

After the third digit has been received, as already described, the switch DS moves on to a fourth position DS4, from which a reset condition for flip-flop IFF is obtained, so that this trigger is restored to its normal condition.

While the principles of the invention have been described above in connection with specific embodiments, and particular modifications thereof, it is to be clearly understood that this description is made only by way of example and not as a limitation on the scope of the invention.

What I claim is:

1. Order transmitting means comprising a plurality of permanent stores, each containing an order, means for receiving a succession of instruction items, said succession comprising either a first group of items, the particular arrangement of which is able to cause transmission, or a second group of items larger in number than said first group whose items corresponding to those of said first group are not able to cause transmission, temporary storing means connected to said receiving means for temporarily storing said items, selecting means connected to said temporary storing means and responsive to the temporary storage therein of a plurality of items equal in number to the number of said first group of instruction items for selecting one of said permanent stores peculiar to said instruction items, the order in each of said permanent stores, selectable by a first group of instruction items being a translation of those instruction items and the order in each of the other of said stores directly selectable by a second group of instruction items being a single code digit having a predetermined relation to the instruction items of said last mentioned second group of instruction items, means connected to said permanent stores and responsive to the selection of a permanent store containing a single code digit together with another instruction item in said temporary storing means having a predetermined relation to the instruction items which selected said permanent store for selecting another permanent store containing a translation of the corresponding second group of items which selected said permanent store, and means for utilizing said translation.

2. Order transmitting means, as defined in claim 1, in which the selecting means comprises a plurality of access cells, each connected to a different one of the permanent stores, a pair of registers, means for transferring instruction items temporarily stored in said temporary storing means from said temporary storing means to said registers, means for preparing an access cell in accordance with the setting of said registers, means for causing a prepared access cell to read out the order from the corresponding permanent store and to transfer it to said utilizing means.

3. Order transmitting means, as defined in claim 2, further comprising means for reinserting the order read from a permanent store into said store again without affecting the utilizing means.

4. Order transmitting means, as defined in claim 1, in which the means responsive to the selection of a permanent store containing a single code digit and to another instruction item for selecting another permanent store comprises a register, means for transferring a single code digit from said permanent store to said register, and gate means responsive to the selection of said permanent store for causing said register to cooperate with the temporary storing means for selecting another permanent store.

5. Order transmitting means, as defined in claim 1, in which the selecting means comprises a plurality of access cells, each connected to a different one of the permanent stores, a pair of registers, means for transferring instruction items temporarily stored in said temporary storing means from said temporary storing means to said registers, means for preparing an access cell in accordance with the setting of said registers, means for causing a prepared access cell to read out the order from the corresponding permanent store and to transfer it to said utilizing means.

References Cited in the file of this patent
UNITED STATES PATENTS

| | | |
|---|---|---|
| 2,701,095 | Stibitz | Feb. 1, 1955 |
| 2,703,361 | Van Duuren | Mar. 1, 1955 |
| 2,785,388 | McWhirter et al. | Mar. 12, 1957 |
| 2,851,534 | Bray et al. | Sept. 9, 1958 |